United States Patent
Lawrence et al.

(10) Patent No.: US 8,433,623 B2
(45) Date of Patent: Apr. 30, 2013

(54) METHODS FOR CREATING A GIFT REGISTRY WEB PAGE WITH RECOMMENDATIONS AND ASSISTANCE

(75) Inventors: Sarah Lawrence, Minneapolis, MN (US); Sarah Peterson, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 104 days.

(21) Appl. No.: 13/153,082

(22) Filed: Jun. 3, 2011

(65) Prior Publication Data
US 2012/0310769 A1 Dec. 6, 2012

(51) Int. Cl.
G06Q 30/06 (2012.01)

(52) U.S. Cl.
USPC .................................................. 705/26.8

(58) Field of Classification Search ........... 705/26.8
See application file for complete search history.

(56) References Cited

U.S. PATENT DOCUMENTS

| | | | |
|---|---|---|---|
| 5,754,981 A | 5/1998 | Veeneman et al. | |
| 5,970,474 A | 10/1999 | LeRoy et al. | |
| 6,609,106 B1 | 8/2003 | Robertson | |
| 6,618,753 B2 | 9/2003 | Holland et al. | |
| 6,793,130 B2 | 9/2004 | Veeneman | |
| 7,013,292 B1 | 3/2006 | Hsu et al. | |
| 7,580,861 B1 | 8/2009 | Song | |
| 7,881,979 B2 * | 2/2011 | Shaer | 705/27.1 |
| 2002/0128934 A1 | 9/2002 | Shaer | |
| 2005/0091120 A1 * | 4/2005 | Auletta | 705/26 |
| 2006/0048070 A1 | 3/2006 | Taylor et al. | |
| 2006/0069627 A1 | 3/2006 | Petersen et al. | |
| 2008/0235085 A1 | 9/2008 | Kovinsky et al. | |
| 2010/0030578 A1 | 2/2010 | Siddique et al. | |
| 2011/0184831 A1 * | 7/2011 | Dalgleish | 705/26.7 |
| 2011/0258125 A1 * | 10/2011 | Iyer | 705/301 |

FOREIGN PATENT DOCUMENTS
AU 2007202523 A1 12/2007

OTHER PUBLICATIONS

Anonymous, "Getting Engaged is Just the Beginning . . . Now What?" Vegreville Observer, Feb. 23, 2011.*
Crate&Barrel, [Online], May 17, 2011, Retrieved from the Internet at: http://global.weddingchannel.com/join/CBMemberLogin.aspx?PartnerKey=WC_CNB, 1 page.
Macy's [Online], May 17, 2010, Retrieved from the Internet at: http://www1.macys.com/registry/wedding/registryhome?cm_sp=global_nav_reg•_•wedding_registry-_-n, 1 page.

* cited by examiner

*Primary Examiner* — Amee A Shah
(74) *Attorney, Agent, or Firm* — Nixon & Vanderhye P.C.

(57) ABSTRACT

In one embodiment, a graphical user interface presents a gift registry having a number of registered products available to purchase through a retailer. The graphical user interface may present a view of information regarding registered products including an image, a description, and a price associated with each registered product. A recommended product may be presented in relation to a registered product, the recommended product selected as being complementary to the registered product. The recommended product information presented may include a product image, a product description and a product selection control.

20 Claims, 6 Drawing Sheets

| Price _352_ | Currently Registered _354_ | Average Recommended _356_ |
|---|---|---|
| $0-$10 _358a_ | 7 | 23 |
| $10-$30 _358b_ | _360_ 15 ✓ _364_ | 15 _362_ |
| $30-$50 _358c_ | 20 | 23 |
| $50+ _358d_ | 12 | 15 |

METHODS FOR CREATING A GIFT REGISTRY WEB PAGE WITH RECOMMENDATIONS AND ASSISTANCE

A user interacts with a web browser in order to view web pages on the Internet while searching for information. A collection of related web pages, for example, created by a single person, company, or entity is referred to as a web site.

Some web sites allow a user to create a user account. To create an account the user is asked to create a username and password and complete an account profile. A completed account profile includes information such as the user's name, home address, and username for social networking sites. When signed on through a combination of username and password, for example, the user accesses information including purchase history, shopping lists, and the shipping status of past purchases.

Some web pages are customized based on the user's account profile. Customized web pages display user specific information including a user specific welcome message, local store information, product reviews from members of the user's social network, and suggested products based on the user's past purchases.

A user creates a gift registry to share purchase interests with others. For example, a user creates a wedding gift registry to allow wedding guests to shop for desired items. Other common registries include baby shower registries, birthday gift registries, and bar or bat mitzvah registries.

SUMMARY

In one embodiment, a graphical user interface presents a gift registry having a number of registered products available to purchase through a retailer. The graphical user interface may present a view of information regarding registered products including an image, a description, and a price associated with each registered product. A recommended product may be presented in relation to a registered product, the recommended product selected as being complementary to the registered product. The recommended product information presented may include a product image, a product description and a product selection control.

In another embodiment, a graphical user interface for a retail environment including a number of brick and mortar stores includes a first region having a main message, and a second region positioned below the first region for displaying information regarding a gift registry. The second region may include a number of item information sub-regions each displaying information regarding a respective item. In an example sub-region, first item information regarding a first item may include a first item graphic, a first item name, and a first item price. The first region may further include a print registry control selectable to cause presentation of a pop-up window. The pop-up window may include a first print control selectable to associate a print request with a particular brick and mortar store and a second print control selectable to cause generation of a print preview GUI. The print preview GUI may include a first preview region including a registry title and a second preview region below the first preview region including one or more printable item sub-regions corresponding to the one or more item information sub-regions. For example, the first item information may correlate to a first printable item sub-region including the first item graphic, the first item name, the first item price, and a first store aisle corresponding to a location of the first item at the first brick and mortar store.

In a further embodiment, a method for creating a gift registry web page includes providing a registry building GUI to a registrant, setting a registry type associated with an event, setting a number of guests invited to the event, and calculating a recommended number of gifts based in part upon the number of guests and the registry type. The recommended number of gifts may be distributed between at least a first gift count recommendation associated with a first price range and a second gift count recommendation associated with a second price range. The method may further include transmitting for display within the registry building GUI, for each price range, a corresponding gift count recommendation, a corresponding price range, and either a corresponding currently registered tally or a corresponding remaining count tally. The method may also include interactively building a gift registry through the steps of (a) receiving user selection of a selected item having an item price, (b) determining the corresponding price range for the item price, (c) adjusting the corresponding currently registered tally or the corresponding remaining count tally, (d) comparing the corresponding currently registered tally or the corresponding remaining count tally to the corresponding gift count recommendation, and (e) repeating steps (a) through (d).

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

DETAILED DESCRIPTION OF ILLUSTRATIVE EMBODIMENTS

Figure 1:
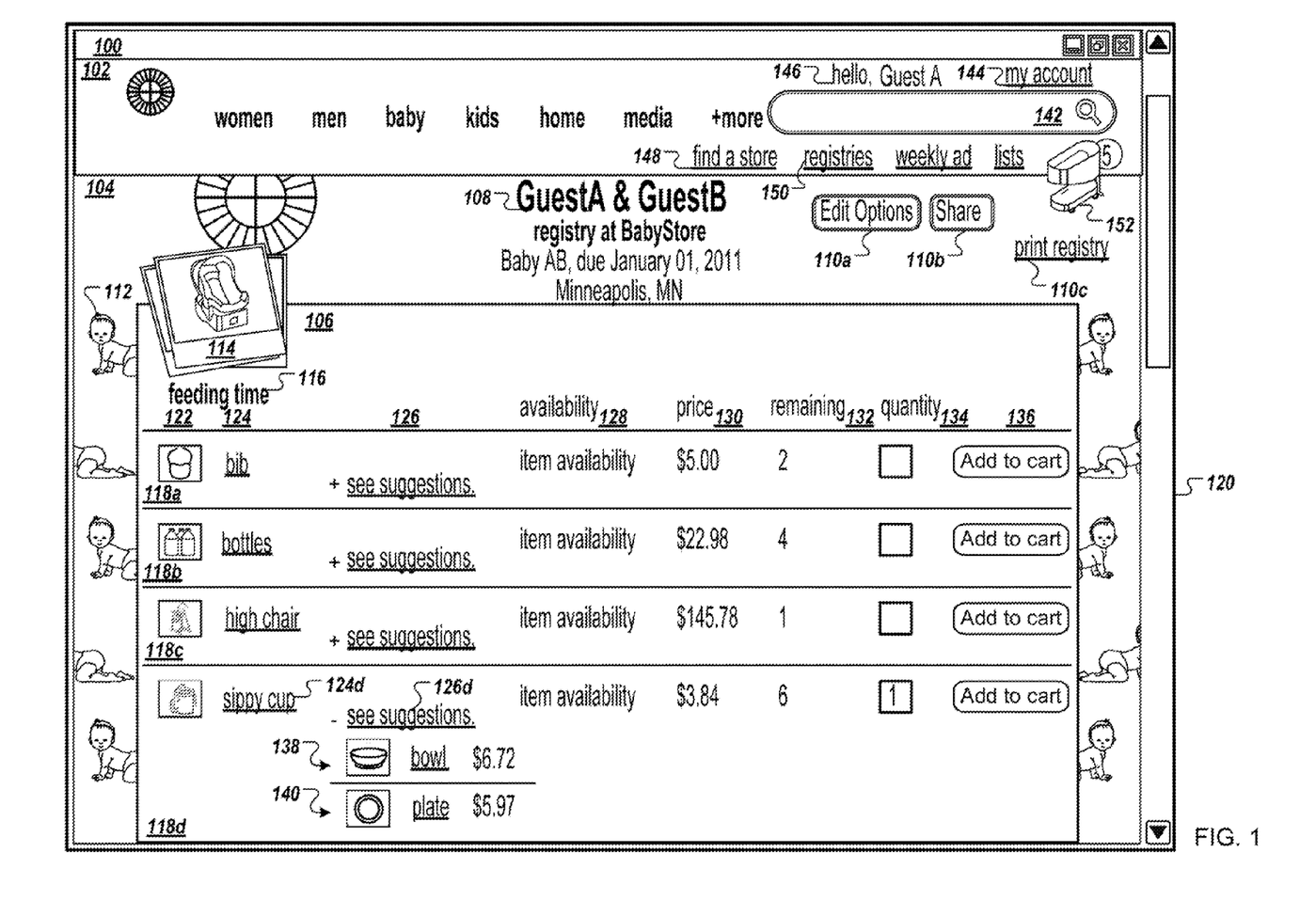
FIG. 1 shows a view of an example retail web page.

FIG. 1 shows a view of an example retail webpage 100 of a retail website. The retail webpage 100 includes an upper region 102 including controls used to navigate the retail website, a second region 104 below the upper region 102 including general gift registry information and controls, and a main region 106 below the second region 104 displaying the contents of a gift registry. A guest accesses the retail webpage 100, in some examples, to review a gift registry and to select one or more gifts for a registrant, while a registrant accesses the retail webpage 100, in some examples, to modify the contents of the gift registry and to update the visual appearance of the gift registry.

The upper region 102 includes a search field 142 used to search for information with the retail website such as products. When a user selects a product for purchase, for example, the product is added to a digital shopping cart, visually represented by a shopping cart icon 152. Rather than purchasing a product through the retail website, in some embodiments, the user selects a find a store control 148 to locate a brick and mortar location. The upper region 102 also includes a personal account control 144 that, upon selection, provides the user a means to access personal account information. To the left of the personal account control 144 is a welcome message 146. In the illustrated example, the welcome message 146 is personalized for GuestA. In some implementations, the welcome message 146 is personalized when a user of the retail website logs into a user account, for example through the personal account control 144. Optionally, account information is automatically derived through a cookie (e.g., data stored on the user's computer by a web browser) generated during a previous visit to the retail website. As another example of personal account information being used to augment the interactive experience the user has with the retail webpage 100, in some embodiments, upon mouse-over of a registries control 150, links to one or more recently access gift registries are displayed to the user (e.g., in an overlay menu, expansion list, or pop-up window). This list of registries, for example up to three registries most recently accessed by the user, in some embodiments, is stored in a browser cookie.

General content regarding the gift registry is provided in the second region 104, such as a registry title message 108 and a set of registry-related controls 110. The registry title message 108, in the illustrated example, informs a visitor that the currently viewed registry belongs to GuestA and GuestB for their Baby AB that has a due date of Jan. 1, 2011. Other examples of gift registry events include weddings, bat and bar mitzvahs, and graduations. Example registry-related controls 110 include an edit options control 110a, a share control 110b, and a print registry control 110c.

The registry-related controls 110 can differ depending upon whether the retail webpage 100 is intended for the registrant or for a guest of the event. For example, the edit options control 110a is displayed for the registrant to provide control over the content of the retail webpage 100, such as the information displayed in the registry title message 108, a wallpaper image 112 displayed as a background to the main content portion (e.g., the main region 106 and, optionally, the second region 104) of the retail webpage 100, or a personal image 114 uploaded by the registrant (e.g., an engagement photo of a couple, an ultrasound image, etc.). For example, the registrant selected a crawling baby wallpaper image 112 for the retail webpage 100. In some embodiments, the registrant is provided with a number of options organized by theme, such as babies, pacifiers, rubber ducks, and pastel umbrellas for a baby registry, or cakes, bells, wedding rings, and flower bouquets for a wedding. In addition or as an alternative to illustration-based wallpaper images, in some implementations the registrant is provided with a variety of colors and, optionally, patterns (e.g., dots; stripes; etc.) as wallpaper images. In some implementations, other features of the retail webpage 100, such as the font color and style of the welcome message 108 or the background color of the main region 106, are automatically coordinated with the selected wallpaper image 112. The registrant, in some embodiments, is presented with design options (e.g., color, font, main region border) to coordinate with the selected wallpaper image 112.

If, instead, the edit options control 110a is displayed to a guest, the edit options control 110a in some examples provides the guest with the opportunity to display only those gifts available for purchase online or only those gifts available to purchase at a particular physical retail store location, or to specify a preferred retail store location or retail stores within a range (e.g., 5, 10, or 20 miles) from a particular geographic location such that the contents of the main region 106 is updated to reflect the selected preferences.

Beside the edit options control 110a, a share control 110b provides the registrant (or, optionally, the guest) the opportunity to share the registry information with additional people. For example, selection of the share control 110b generates a pop-up window including fields for entering one or more email addresses. The print registry control 110c, when selected, provides the registrant or guest with a printable version of the gift registry.

In some implementations, more or fewer registry controls 110 are displayed within the second region 104 or the registry controls 110 are provided using different styles of interactive controls. For example, rather than a button, the edit options control 110a is optionally displayed as a hypertext link (e.g., such as the print registry control 110c). In some embodiments, one or more of the registry controls 110 are located in the main region 106, the upper region 102, or an additional region not displayed in the retail webpage 100 (e.g., a footer region displayed at the bottom of the retail webpage 100, accessible through a scroll bar 120).

In some implementations, personalized information directed to the registrant is included in the second region 104 or, alternatively, in another portion of the retail webpage 100 or in a separate portion not illustrated (e.g., upon accessing a "What's New" tab, in a left or right column area arranged next to the main region 106, etc.). In one example, when generating the retail webpage 100, information is accessed regarding the gift registry to provide a personalized tips message to the registrant. If the registry was created within a threshold number of days or includes fewer than a threshold number of registered products, for example, a getting started message is displayed encouraging the registrant to add items to the registry or explaining one or more features of the registry creation process (e.g., how to set a background wallpaper image, how to upload a personalized image, etc.). In the circumstance of an established gift registry, if a number of gifts available for purchase drops below a threshold number or percentage, a warning message is displayed encouraging the registrant to provide additional product options for guests to select. In a third example, if the date of the event has passed, a congratulations message is displayed on the retail webpage 100.

Additionally or alternatively, in some embodiments, tips messages are issued to the registrant, for example through email or Short Message Service (SMS) text message. In some implementations, the registrant specifies a means for receiving personalized tips messages, for example through an option available within one of the registry-related controls 110 such as the edit options control 110a.

Turning to the main region 106, a number of product information sub-regions 118 are arranged beneath a product category title 116, "feeding time" in the example shown. In some embodiments, the product information sub-regions 118 are divided into categories and sub-categories, while in further embodiments no categorization is provided for the registered products. Examples of types of categorization include by use (e.g., "feeding time," "bath time," "sleepy time," etc.) and by store department (e.g., "housewares," "bed and bath," "apparel," etc.). Categories used, in some embodiments, depend upon event type. In one example, a wedding registry is categorized by store department while a baby registry is categorized by use.

Information within each product information sub-region 118 is organized in columns, such that each sub-region includes a product image 122 displaying a thumbnail image of the product, a product description 124 including a name and, optionally, additional detail information regarding the product (e.g., color, size, brand name, etc.), a recommended products control 126 selectable to cause display of information regarding additional products, product availability information 128 (e.g., in store only, online only, back order, discontinued, etc.), a product price 130, a remaining products indicator 132 (e.g., number of duplicates registered for but not yet purchased or number of items remaining for sale through the retail website), a quantity to purchase entry field 134 (e.g., used to purchase more than one of a particular item), and a product purchase control 136 (e.g., selectable to add the described item to a digital shopping cart). In some implementations, more or fewer columns are displayed. In some embodiments, for example, the column including the product purchase control 136 is not included when the view of the gift registry is created for the registrant.

Regarding the recommended products control 126, upon selection, one or more recommended products are displayed that are related to the respective product in the registry. For example, in the sub-category 118d beside a sippy cup product description 124d, a recommended products control 126d has been selected, causing the expansion of a list of recommended products including a bowl 138 and a plate 140. In one example, the registrant selects the recommended products control 126d to view the list of suggested items 138 and 140 to determine one or more additional products to add to the gift registry. The list of recommended products, in some examples, is derived based upon one or more of the browsing habits of the registrant, previous purchases of the registrant, items included in gift registries that also include the respective product, and items commonly purchased together from the retail website. In some embodiments, attributes of the respective product are considered when determining recommended products. For example, if the registrant has registered for a red toaster, a red coffee maker may be included in the list of recommended products.

If, instead, the retail webpage 100 is generated for display to a guest of the event, the list of suggested items 138 and 140, in some examples, includes complementary items to the respective registry product. The guest has the opportunity to add one or more of the suggested items to a purchase order in addition to the registry item to complete a gift order. In the illustration, the bowl 138 and the plate 140 are coordinating items with the sippy cup 124d to create a dining set.

Although the recommended products control 126d is illustrated as an expandable category that, upon selection, displays information within the main region 106, some embodiments include a button or other control selectable to produce a pop-up window illustrating one or more recommended products. In other implementations, rather than a control activated by a mouse click or similar active input from the user, mouse-over of a portion of a particular product information sub-region causes the display of one or more recommended products related to the product illustrated in the associated product information sub-region. Further embodiments include a separate recommended products region, such as a product information carousel illustrated above or beneath the main region 106.

Figure 2A:
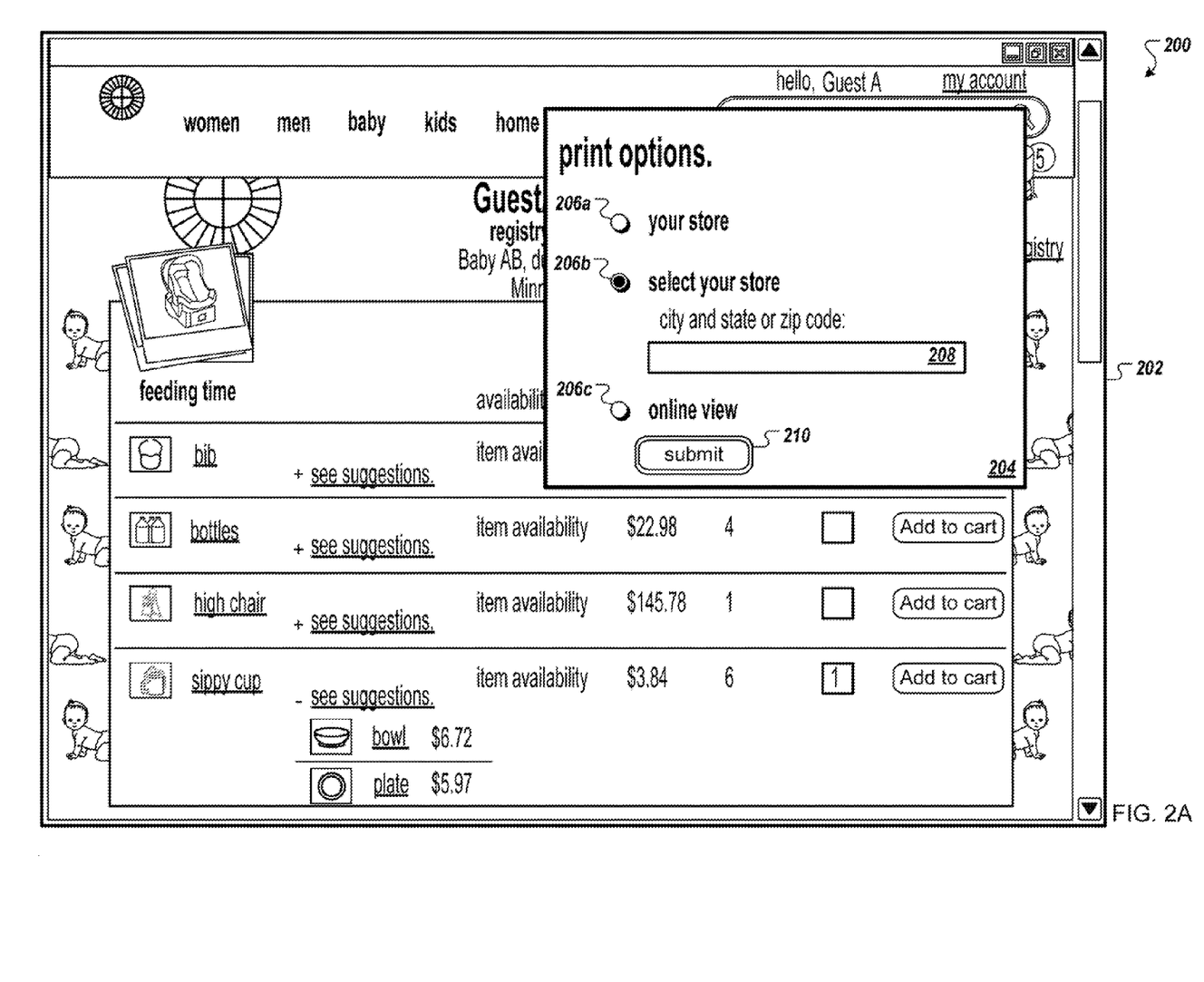
FIGS. 2A and 2B show an example of printing a gift registry through a graphical user interface.
Figure 2B:
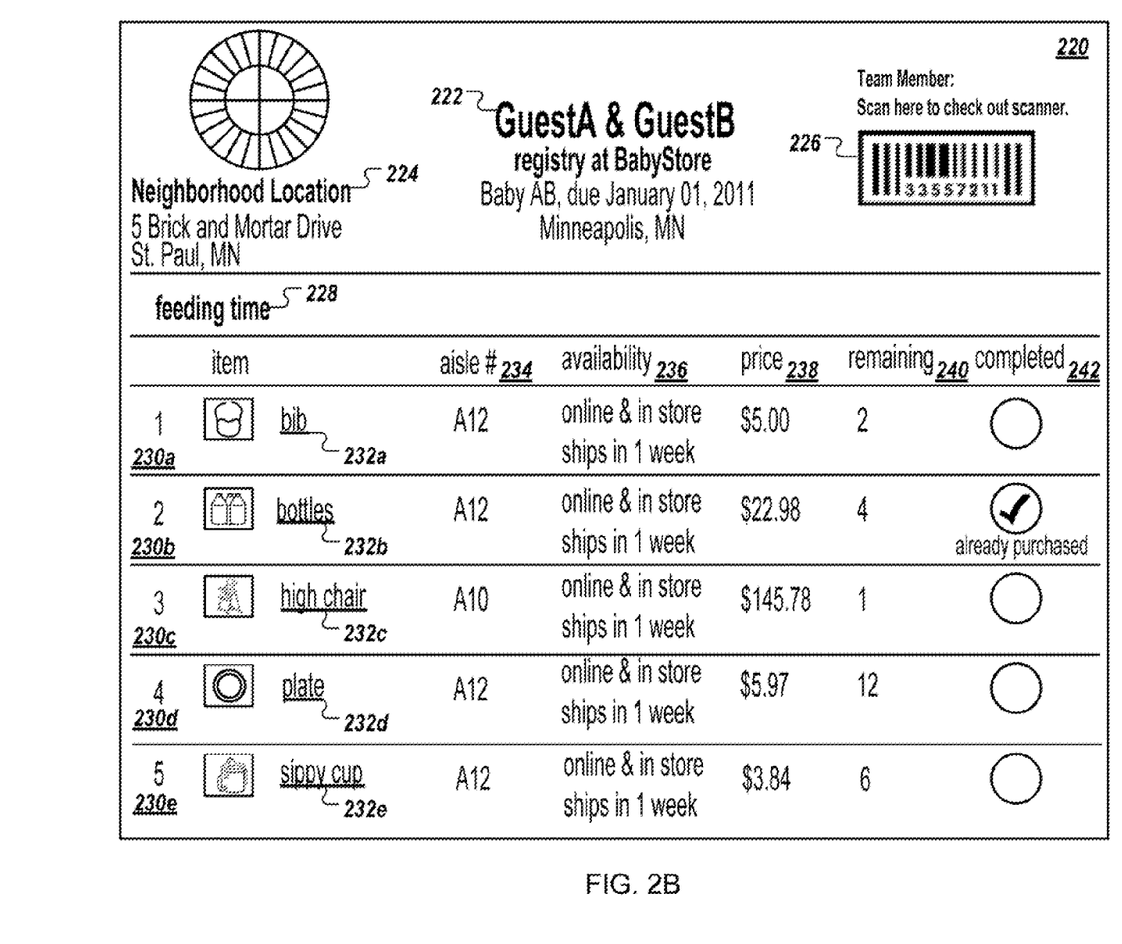

FIGS. 2A and 2B show an example of printing a gift registry through a graphical user interface 200 including a retail webpage 202, such as the retail webpage 100 described in relation to FIG. 1. As illustrated in FIG. 2A, the retail webpage 202 is overlaid by a print options pop-up window 204. In some implementations, the print options pop-up window 204 is displayed in response to user activation of a control such as the print registry control 110c described in relation to FIG. 1. The print options pop-up window 204 includes three radio buttons 206: a "your store" button 206a, a "select your store" button 206b coordinated with an address entry field 208, and an "online view" button 206c.

In some embodiments, more or fewer buttons are presented in the print options pop-up window 204. For example, the "your store" button 206a selects a brick and mortar store location associated with account settings of the current user. If no user has logged into a personal account, or if the user logged in has not been associated with a brick and mortar store location (or, optionally, a home address used to derive a brick and mortar store location), in some implementations the print options window 204 does not display the "your store" button 206a as one of the options. In further implementations, a brick and mortar store is associated with a user through other data collection means (e.g., global positioning system (GPS) coordinates supplied by a smart phone while the user is browsing the retail website on the smart phone).

Rather than automatically associating a user with a brick and mortar store location, in some implementations the "select your store" button 206b and coordinated address input field 208 are provided to the user to identify a particular brick and mortar store location. For example, based upon the address typed into the address input field 208, one or more closest regional stores are presented to the user for selection of a preferred brick and mortar location.

If, instead, no physical location is desired (e.g., the user is not planning on visiting a brick and mortar store location with the printout of the gift registry), the user selects the "online view" button 206c. Upon making a selection of one of the three radio control buttons 206, the user activates a submit button 210 to submit the print request. Submission of the print request, in some examples, can correspond to issuance of a print document to a printer associated with the device presenting the retail webpage 202, presentation of a printer selection interface (e.g., in the same pop-up window or an additional viewing location) or visual presentation of a print preview document within the retail webpage 202 or an additional webpage or pop-up window.

FIG. 2B illustrates a print preview document 220 presented in response to submission of a gift registry print request including specification of a particular brick and mortar store location. In some implementations, the print preview document 220 is presented in response to selection of the submit button 210 as described in relation to FIG. 2A. The print preview document 220, in some embodiments, is displayed at a brick and mortar store information kiosk in response to user selection of a particular gift registry. The print preview document 220 has a header region including gift registry information 222 specifying a particular gift registry, a brick and mortar store address 224 specifying a particular retailer brick and mortar location, and a bar code 226 provided for scanning at checkout at a brick and mortar store location such as the location provided by the store address 224. In some embodiments, driving directions, a map, or other details regarding the brick and mortar store are included in the print preview document 220. The store address 224, in some implementations, is not included, for example when printing the gift registry from a kiosk located at a particular brick and mortar store.

Similar to the retail webpage 100, the print document 220 includes an item category 228 of "feeding time", as well as item information sub-regions 230 listing items such as "bib" 232a, "bottles" 232b, "high chair" 232c, "plate" 232d, and "sippy cup" 232e. Each of the item descriptions 232 is associated with a shopping aisle 234 at the brick and mortar store. An availability field 236, in some implementations, presents availability related to items in stock at the particular brick and mortar store as well as, if applicable, pricing 238 specific to the specified brick and mortar store location and number of items in stock 240 at the specified brick and mortar store. A final column of information, entitled "completed" 242, indicates whether the listed item has already been purchased. Although the items are illustrated in alphabetical order, in some implementations the items are ordered by shopping aisle 234 or grouped by availability 236 (e.g., any item not available and in stock in the brick and mortar store placed at the end of the document, etc.). In some embodiments, more or fewer columns of information are included in the item information sub-regions 230. In one example, the print preview document 220 only lists those registry items that are available for purchase on the gift registry.

Figure 3A:
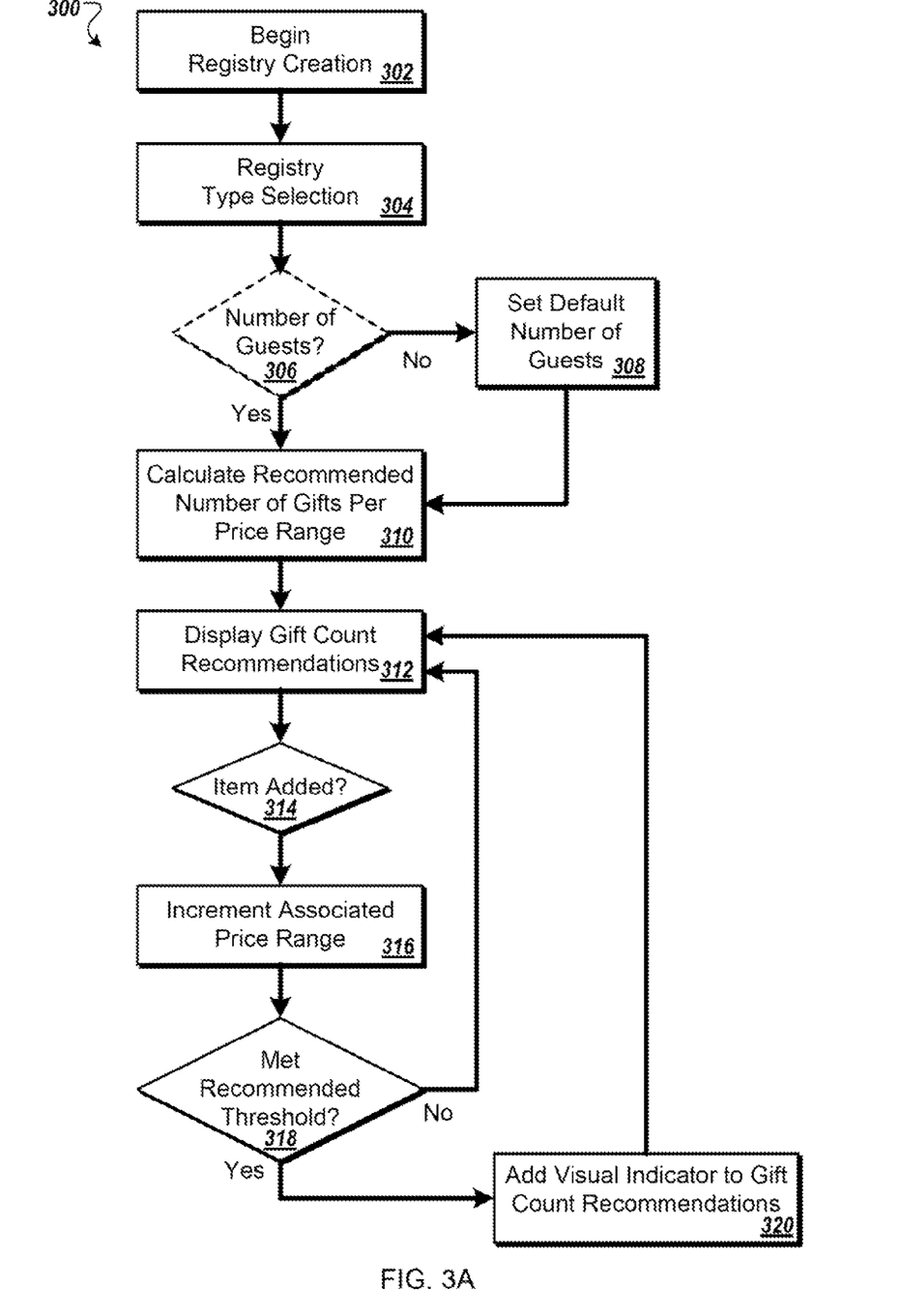
FIG. 3A is a flow chart illustrating an example method for building a gift registry.

FIG. 3A is a flow chart illustrating an example method 300 for building a gift registry using a retail webpage such as the retail webpage 100 described in relation to FIG. 1. The method 300 is used, for example, to guide a registrant through the process of registering for gifts for an event by providing a visual indication regarding the number and price distribution of the gifts already added to the registry, as well as a recommendation of a total number of gifts to add to the registry per suggested price range.

The method 300 begins with creation of a registry template (302). For example, upon selecting a "new registry" control on a retail web site, a registrant begins the process of building a gift registry associated with an event. Initial information collected, in some examples, includes the name and location of the registrant, the date of the event, and contact information (e.g., email address, phone number, etc.) of the registrant. Included in the information gathered during registry creation, in some embodiments, is a type of gift registry (304). Examples of types of gift registries include weddings, baby showers, bat and bar mitzvahs, and Quinceañera celebrations. In some implementations, the type of gift registry is inherent upon selection of the "new registry" control. For example, many retail web sites include separate registry creation pages for weddings and baby showers.

Optionally, the registrant provides a number of guests invited to the event (306). If a number of guests is not specified, a default number of guests is established (308). In some embodiments, the default number of guests is based in part on the type of event. For example, weddings typically involve a larger number of guests than do wedding showers. The default number of guests, in some embodiments, is partially based upon the location of the registrant. For example, prior historical data collected by the retailer (e.g., through registry creation at the retail site or via other means) could illustrate trends in event size that differ moderately or dramatically on a regional basis.

Based upon the number of guests, a number of recommended gifts is calculated (310). In an illustrative example, a suggestion of 1.3 items per guest is provided. Furthermore, the total number of suggested products is distributed between two or more price ranges. The price ranges, in some embodiments, differ based upon the type of event. For example, the average wedding gift is more expensive than the average baby shower gift. In one example, based upon a wedding involving ninety total guests, the registrant is advised to register for a total number of 117 gifts distributed between four price ranges: between $0 and $10, $10 and $30, $30 and $50, and over $50. Additionally, the example recommendation distributes the gifts to include thirty percent of the items in the $0 to $10 range, twenty percent of the items in the $10 to $30 range, thirty percent of the items in the $30 to $50 range, and twenty percent of the items in the over $50 range.

Figure 3B:
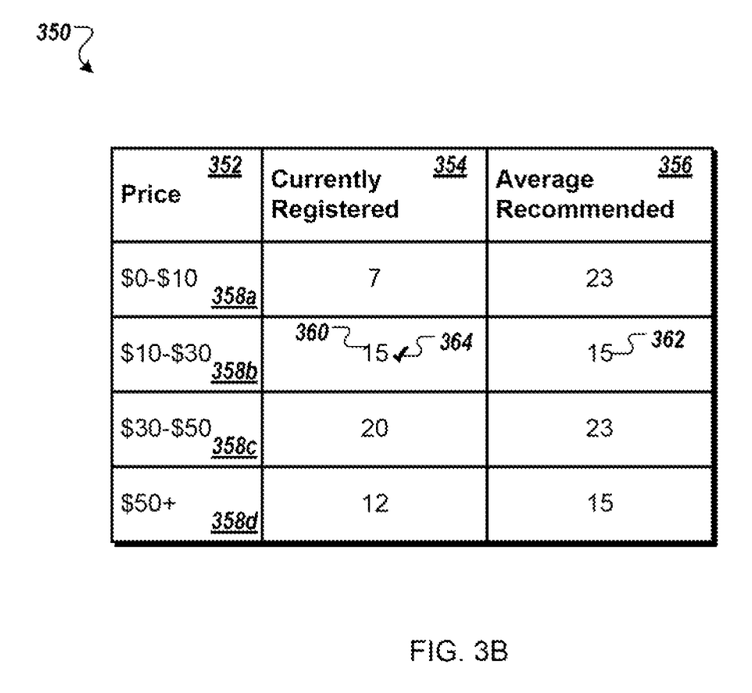
FIG. 3B is a chart illustrating an example gift count tally associated with a gift registry.

The gift count recommendations are displayed for the registrant in a registry building web page (312). For example, as illustrated in FIG. 3B, a chart 350 presents a visual allocation of a total gift count tally associated with the gift registry. The chart 350, in some examples, is provided on a gift registry webpage, for example in a column area to the left or right of a GUI region displaying information regarding the currently registered gifts. In one example, the chart 350 is optionally incorporated into the retail webpage 100 illustrated in FIG. 1 in a region to the right of the main region 106. In other examples, the chart 350 is displayed in a floating widget or a pop-up window. The chart 350 includes a price column 352 listing four price ranges: a $0 to $10 price range 358a, a $10-$30 price range 358b, a $30-$50 price range 358c, and an over $50 price range 358d. Presented next to the price column 352 is a currently registered column 354 including fields indicating the number of gifts the registrant has added to the gift registry in each of the presented price ranges 358. As a comparison, in a third column 356, an average recommended number of gifts is listed for each of the price ranges 358. As the registrant adds gifts to the registry, the chart 350 is updated to reflect the current content of the gift registry in comparison to the suggested distribution of products.

Returning to the method 300 in FIG. 3A, upon addition of an item to the gift registry (314), a running tally is kept where the total registered items per price range is updated (316). For example, the total number of gifts is incremented for the price range associated with the recently added item. As illustrated in FIG. 3B, this would mean that a field of the currently registered column 354 would be incremented to reflect the addition of the gift to the registry.

As illustrated in the method 300 of FIG. 3A, the running tally in the associated price range is additionally compared to the recommended number of gifts (318) (e.g., as listed in the third column 356 of FIG. 3B). If it is found that the value in the currently registered column 354 equals the value in the average recommended column 356, a visual indicator is added to the gift count recommendations (320). For example, as illustrated in FIG. 3B, a currently registered count 360 in the $10 to $30 price range 358b is fifteen, equal to an average recommended number of registered gifts 362 for the same price range 358b. A check mark 364 provides a visual indicator to the registrant that the registrant has fulfilled a threshold number of registered gifts for that price range.

The method 300, in some embodiments, can include more or fewer steps. In one example, while tracking the tally of registered gifts, the product recommendations provided by the recommended products control 126 (as described in relation to FIG. 1) promotes recommendations in price ranges furthest from meeting the threshold recommended number of gifts. For example, once the recommended number of registered gifts in the $10-$30 price range has been met, the method 300 ceases promoting product recommendations within the $10-$30 price range. In some embodiments, an additional level of recommendation or an alternative recommendation provides the registrant with a breakdown of gifts per product category (e.g., a first percentage categorized as housewares, a second percentage categorized as bath, a third percentage categorized as bedding, etc.). This additional tracking method, for example, provides an ongoing analysis of the distribution of the registry per common gift types. Other implementations are possible.

Figure 4:
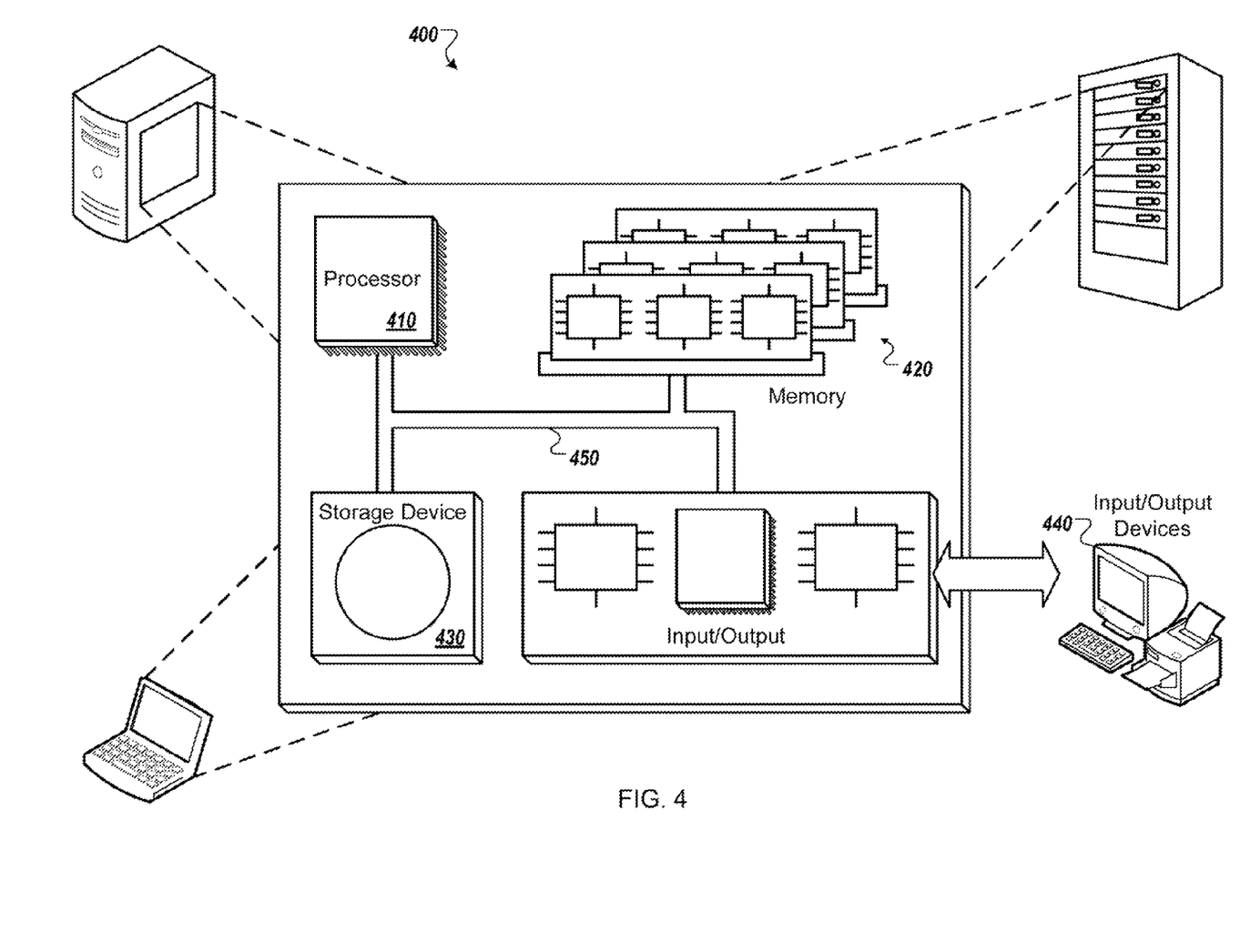
FIG. 4 is a block diagram of a computing system optionally used in connection with computer-implemented methods described in this document.

FIG. 4 is a schematic diagram of a generic computer system 400. The system 400 is optionally used for the operations described in association with any of the computer-implemented methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 is optionally a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A computer-implemented method for creating a gift registry web page comprising:
   providing a registry building graphical user interface ("GUI") to a registrant;
   setting a registry type associated with an event;
   setting a number of guests invited to the event;
   calculating, by a processor using an algorithm, a recommended number of gifts based in part upon the number of guests and the registry type, wherein the recommended number of gifts is distributed between at least a first gift count recommendation associated with a first price range and a second gift count recommendation associated with a second price range;
   transmitting for display within the registry building GUI, for each price range, a corresponding gift count recommendation, a corresponding price range, and one of a corresponding currently registered tally and a corresponding remaining count tally; and
   interactively building, by the processor, a gift registry through the steps of (a) receiving user selection of a selected item having an item price, (b) determining the corresponding price range for the item price, (c) adjusting the corresponding currently registered tally or the corresponding remaining count tally, (d) comparing the corresponding currently registered tally or the corresponding remaining count tally to the corresponding gift count recommendation, and (e) repeating steps (a) through (d).

2. The computer-implemented method of claim 1 wherein, responsive to determining that the corresponding gift count recommendation is equivalent to the corresponding currently registered tally or the corresponding remaining count tally displaying, within the registry building GUI, a visual indicator associated with the corresponding price range.

3. The computer-implemented method of claim 1, further comprising receiving a number of invitees from the registrant through the GUI, wherein setting the number of guests includes equating the number of invitees to the number of guests.

4. The computer-implemented method of claim 1, wherein setting the number of guests includes selecting a default number of guests based upon the registry type.

5. The computer-implemented method of claim 1, wherein providing the registry building GUI includes the steps of:
   comparing a current calendar date to a registry creation date to determine registry age;
   comparing a current date to an event date to determine a countdown date;
   selecting a welcome message based in part upon at least one of the registry age and the countdown date; and
   displaying the welcome message in a top region of the registry building GUI.

6. The computer-implemented method of claim 5, wherein providing the registry building GUI further includes the step of determining a number of registered gifts, and the welcome message is further based in part upon the number of registered gifts.

7. The computer-implemented method of claim 1, wherein the registry building GUI includes a wallpaper control selectable to associate a background image with a gift registry GUI.

8. A computer-implemented method for creating a gift registry web page comprising:
   a processor displaying a registry building GUI to a registrant via a computer network; the processor setting a registry type associated with an event based on user input;
   the processor setting a number of guests associated with the event based on one of a user input and a default number according to the registry type;
   the processor, using an algorithm, calculating a recommended number of gifts based in part upon the number of guests and the registry type, wherein the recommended number of gifts is distributed between at least a first gift count recommendation associated with a first price range and a second gift count recommendation associated with a second price range;
   the processor determining and displaying, for each price range, a corresponding gift count recommendation, a corresponding price range, and at least one of a corresponding currently registered tally and a corresponding remaining count tally; and
   the processor interactively building the gift registry through the steps of
   (a) receiving via the computer network user selection of a selected item having an item price,
   (b) the processor determining the corresponding price range for the item price and adjusting the at least one of the corresponding currently registered tally or the corresponding remaining count tally,
   (c) the processor comparing the corresponding currently registered tally or the corresponding remaining count tally to the corresponding gift count recommendation, and
   (d) repeating steps (a) through (c).

9. The computer-implemented method of claim 8, wherein responsive to determining that the corresponding gift count recommendation is equivalent to the corresponding currently registered tally or the corresponding remaining count tally, the processor displays a visual indicator associated with the corresponding price range.

10. The computer-implemented method of claim 8, further comprising receiving via user input over the computer network a number of invitees from the registrant, wherein setting the number of guests includes equating the number of invitees to the number of guests.

11. The computer-implemented method of claim 8, wherein setting the number of guests includes the processor selecting a default number of guests based upon the registry type.

12. The computer-implemented method of claim 8, wherein providing the registry building GUI includes the steps of:
   the processor comparing a current calendar date to a registry creation date to determine registry age;
   the processor comparing a current date to an event date to determine a countdown date;
   the processor selecting a welcome message based in part upon at least one of the registry age and the countdown date; and
   the processor displaying the welcome message.

13. The computer-implemented method of claim 12, wherein providing the registry building GUI further includes the step of determining a number of registered gifts, and displaying the welcome message based in part upon the number of registered gifts.

14. The computer-implemented method of claim 8, wherein the registry building GUI includes a wallpaper control selectable to associate a background image with a gift registry GUI.

15. A method for creating a gift registry via a server computer including a programmable processor executing a program of instructions stored on a computer memory, the server interacting with client computers via a computer network, the method comprising:
   a processor setting a number of guests associated with an event based on one of a user input and a default number according to registry type;
   the processor, using an algorithm, calculating a recommended number of gifts based in part upon the number of guests and the registry type, wherein the recommended number of gifts is distributed between at least a first gift count recommendation associated with a first price range and a second gift count recommendation associated with a second price range;
   the processor determining and displaying, for each price range, a corresponding gift count recommendation, a corresponding price range, and at least one of a corresponding currently registered tally and a corresponding remaining count tally; and
   interactively building the gift registry through the steps of
   (a) receiving via the computer network user selection of a selected item having an item price,
   (b) the processor determining the corresponding price range for the item price and adjusting the at least one of the corresponding currently registered tally or the corresponding remaining count tally,
   (c) the processor comparing the corresponding currently registered tally or the corresponding remaining count tally to the corresponding gift count recommendation, and
   (d) the processor identifying recommended products that are related to the selected item.

16. The method of claim 15, wherein step (d) is practiced according to browsing habits of the user.

17. The method of claim 15, wherein step (d) is practiced according to previous purchases of the user.

18. The method of claim 15, wherein step (d) is practiced according to one of non-user gift registries that also include the selected item and items commonly purchased with the selected item.

19. The method of claim 15, wherein when the at least one of the corresponding currently registered tally or the corresponding remaining count tally matches the recommended number of gifts for one of the first price range and the second price range, step (d) is practiced by identifying only products in the other of the first price range and the second price range.

20. The method of claim 15, further comprising displaying a personalized tips message based on one of a number of days since the gift registry was created and a number of registered products in the gift registry.

* * * * *